(12) United States Patent
Biesse et al.

(10) Patent No.: US 8,562,371 B2
(45) Date of Patent: Oct. 22, 2013

(54) CONNECTION DEVICE BETWEEN AN ELECTRICAL CABLE AND A CONDUCTING STRUCTURE, ESPECIALLY FOR A CURRENT RETURN CIRCUIT

(75) Inventors: Jean-luc Biesse, Saint Lieux les Lavaur (FR); Didier Laurent, Fronton (FR); Serge Roques, Cornebarrieu (FR)

(73) Assignee: Labinal, Blagnac (FR)

( * ) Notice: Subject to any disclaimer, the term of this patent is extended or adjusted under 35 U.S.C. 154(b) by 0 days.

(21) Appl. No.: 13/060,190

(22) PCT Filed: Aug. 19, 2009

(86) PCT No.: PCT/FR2009/051602
§ 371 (c)(1),
(2), (4) Date: Jun. 7, 2011

(87) PCT Pub. No.: WO2010/020733
PCT Pub. Date: Feb. 25, 2010

(65) Prior Publication Data
US 2011/0237104 A1    Sep. 29, 2011

(30) Foreign Application Priority Data

Aug. 21, 2008 (FR) .................................... 08 55657
Feb. 25, 2009 (FR) .................................... 09 51196

(51) Int. Cl.
*H01R 13/627* (2006.01)
(52) U.S. Cl.
USPC ........................................................ 439/352
(58) Field of Classification Search
USPC .......... 439/352, 372, 752, 348, 271; 403/315, 403/155, 252; 74/502.4; 24/656
See application file for complete search history.

(56) References Cited

U.S. PATENT DOCUMENTS

| 2,845,291 | A | * | 7/1958 | Priestman | 403/14 |
| 4,883,397 | A | * | 11/1989 | Dubost | 411/174 |
| 4,934,366 | A | * | 6/1990 | Truex et al. | 607/37 |
| 5,499,448 | A | * | 3/1996 | Tournier et al. | 29/863 |
| 5,518,332 | A | * | 5/1996 | Katoh | 403/155 |
| 5,704,100 | A | * | 1/1998 | Swan | 24/656 |
| 6,030,722 | A | | 2/2000 | Kuboshima et al. | |
| 6,056,577 | A | * | 5/2000 | Blanchet | 439/352 |
| 6,234,706 | B1 | * | 5/2001 | Hodzic | 403/252 |
| 6,490,947 | B2 | * | 12/2002 | Burger | 74/502.4 |
| 6,835,084 | B2 | * | 12/2004 | Poon et al. | 439/349 |
| 6,854,946 | B2 | * | 2/2005 | Bauer | 411/523 |

(Continued)

FOREIGN PATENT DOCUMENTS

| DE | 197 14 511 | 11/1997 |
| DE | 102 11 634 | 10/2003 |
| EP | 0 422 372 | 4/1991 |
| EP | 1 253 671 | 10/2002 |

OTHER PUBLICATIONS

International Search Report Issued Dec. 2, 2009 in PCT/FR09/051602 filed Aug. 19, 2009.

*Primary Examiner* — Alexander Gilman
(74) *Attorney, Agent, or Firm* — Oblon, Spivak, McClelland, Maier & Neustadt, L.L.P.

(57) ABSTRACT

Connection between two elements of an electrical return circuit. The device comprises a female type connection receptacle fastened to a conductive structure and a male type plug connected to a cable, said plug including a groove, and a locking spring co-operating with the plug and with the receptacle.

13 Claims, 7 Drawing Sheets (56) References Cited

U.S. PATENT DOCUMENTS

| | | | |
|---|---|---|---|
| 7,309,247 B1 * | 12/2007 | Keating | 439/271 |
| 7,331,813 B2 * | 2/2008 | Tsujita | 439/348 |
| 7,568,855 B2 * | 8/2009 | Fitzler et al. | 403/315 |
| 7,581,958 B2 * | 9/2009 | Swanson et al. | 439/63 |
| 7,914,347 B2 * | 3/2011 | Paulus | 439/680 |
| 7,999,202 B2 * | 8/2011 | Fujita et al. | 200/275 |
| 8,221,150 B2 * | 7/2012 | Houir Alami | 439/352 |
| 2002/0160665 A1 | 10/2002 | Krause et al. | |
| 2004/0038596 A1 * | 2/2004 | Bartholoma et al. | 439/752 |
| 2007/0184700 A1 | 8/2007 | Swanson et al. | |

\* cited by examiner

CONNECTION DEVICE BETWEEN AN ELECTRICAL CABLE AND A CONDUCTING STRUCTURE, ESPECIALLY FOR A CURRENT RETURN CIRCUIT

The invention relates to a connection device between an electric cable and any conductive structure. As a preferred application, the invention relates to interconnecting electrical return circuits, in particular in an airplane.

In modern aircraft, more and more metal structures are being replaced by carbon structures, particularly in the fuselage. This makes it necessary to provide a specific electrical return circuit for electronic equipment, which return circuit is constituted by independent conductor elements (cables, conductive strips, etc.) that are electrically interconnected.

Proposals have been made to use cables that are interconnected by lugs that are crimped to conductive structural elements, e.g. flat metal strips. Lugs are fastened by means of rivets. That solution is effective from an electrical point of view, but it does not enable connection to be performed simply and quickly, as is sometimes necessary in order to detect faults and/or to perform maintenance operations. That type of solution makes it necessary to drill out the rivet in order to disconnect the conductive elements. Such destruction of rivets constitutes a loss of time and it is not always easy to put new rivets back in the locations where the disconnections were made.

Furthermore, in the field of aviation, standards require connection devices to be locked, the contact zone to be thoroughly sealed, and in particular to be prevented from turning.

The invention enables all of those problems to be solved, in particular locking the contact and ensuring sealing.

More particularly, the invention firstly provides a connection device between an electric cable and a conductive structure, the device being characterized in that it comprises a female type connection receptacle fastened to said conductive structure, and a male type plug connected to one end of said cable, in that said receptacle includes a bore shaped and dimensioned to receive said plug with electrical contact, in that said plug includes a groove, and in that a locking spring is mounted on said connection receptacle and includes a flexible branch suitable for engaging in said groove when said plug is engaged in said bore.

In an embodiment, the groove is formed in the vicinity of the end of the plug and the bore is a through bore; it therefore presents an inlet orifice via which the plug is engaged and an outlet orifice through which the end of the plug projects. The length of the plug and the length of said bore are such that the groove is situated outside the outlet orifice when the plug is engaged therein. The locking spring is situated in the vicinity of said outlet orifice in order to co-operate with the groove of said plug.

Under such circumstances, the spring includes at least one curved branch suitable for engaging in said groove.

Advantageously, the spring forms an approximately U-shaped hairpin mounted between two projecting elements of said receptacle that are situated beside the outlet orifice. The branches of the hairpin have facing curved portions in the vicinity of the outlet orifice on either side thereof. The arrangement is such that said curved portions lie on the path of the end of the plug where it comes out of the receptacle. They are momentarily splayed apart by the end of the plug until they become automatically reinserted in the groove.

Concerning the sealing of the electrical contact zone, the receptacle includes in particular an annular sealing gasket that surrounds the inside of said outlet orifice.

In an embodiment, the receptacle also includes an annular inlet gasket fastened on the outside around said inlet orifice. Advantageously, the plug includes a shoulder that comes to bear against the inlet gasket. Advantageously, the distance between said shoulder and the groove situated at the end of the plug is such that the inlet gasket is compressed and held compressed when the spring is engaged in the groove.

In another embodiment, the device is characterized in that said groove is formed at a distance from the end of said plug, in that said bore in said receptacle presents an inlet orifice via which the plug is engaged, in that the length of the plug and the length of said bore are such that said groove is situated outside the inlet orifice when the plug is engaged in said bore, and in that said locking spring comprises a cover shaped to co-operate both with said groove and with a projecting rim of said receptacle.

Under such circumstances, the bore in the receptacle is advantageously a blind hole.

In an advantageous embodiment, the plug is extended by a bushing having a deformable wall constituting a crimping cylinder. The conductive core of the electric cable is engaged in a blind hole in said bushing and is held therein by flattening its wall.

The invention can be better understood and other advantages thereof appear more clearly in the light of the following description of a presently preferred embodiment of a connection device in accordance with the principle of the invention, given purely by way of example and with reference to the accompanying drawings, in which.

Figure 1:
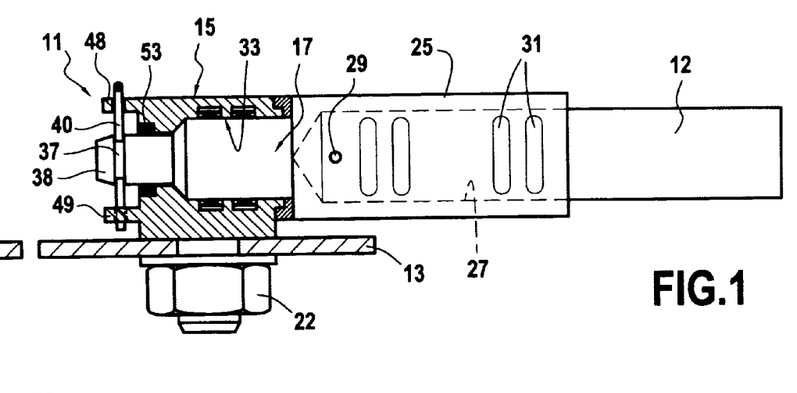
FIG. 1 is a general view in section on I-I of FIG. 2 showing the connection device in accordance with the invention, connection being established.
Figure 2:
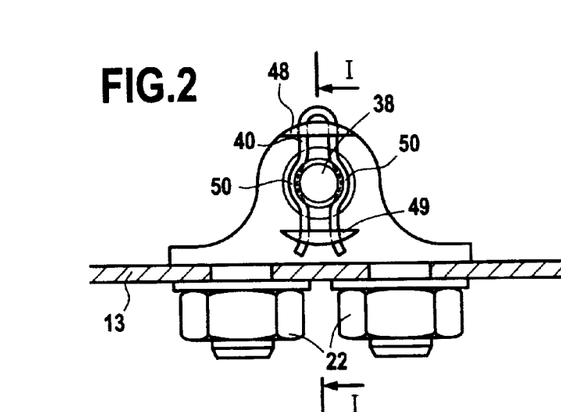
FIG. 2 is a view looking along arrow II of FIG. 1.
Figure 3:
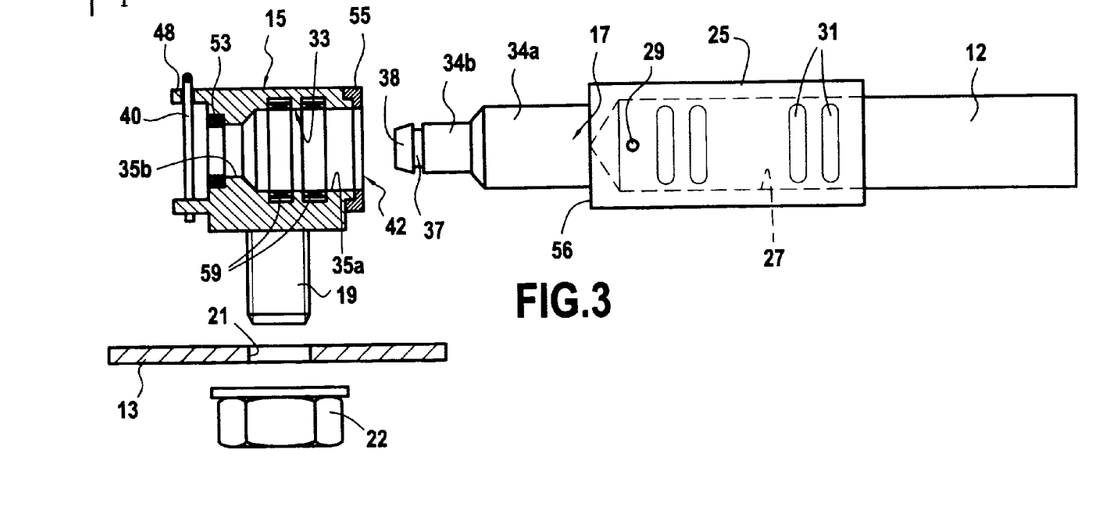
FIG. 3 is a view analogous to FIG. 1 showing the elements of the connection device separate from one another.

With reference to FIGS. 1 to 3, there can be seen a connection device 11 for making a connection between an electric cable 12 and a conductive structure 13, here a flat conductor, such as for example a bar forming part of an electrical return circuit in an airplane. The connection device comprises a connection receptacle 15 of the female type that is fastened to the conductive structure 13, and a plug 17 of the male type that is connected to one end of said cable 12.

The term "electric cable" should be understood broadly, since it covers any electrical conductor suitable for forming part of a wired electrical network.

The receptacle 15 is made of high conductivity metal, and in this example it includes two threaded extensions 19 passing through respective holes 21 in the conductive structure. Nuts 22 are engaged on the threaded portions so as to provide both mechanical assembly and electrical connection between the receptacle 15 and said conductive structure 13. Some other number of threaded projections could be provided for fastening purposes.

Furthermore, the plug 17, also made of high conductivity metal, is extended by a bushing 25 having a deformable wall constituting a cylinder for crimping. The bushing thus has a blind hole 27 and as a result its wall is thin enough to enable it to be flattened. A conductive end of the electric cable is engaged in the blind hole and is held therein by flattening and permanently deforming the wall. The bushing 25 also has a inspection slot or hole 29 opening out into the blind hole in the vicinity of its inside end. This inspection hole serves to verify that the electric cable 12 is properly inserted into the blind hole 27 before crimping. The crimping marks 31 can be seen in FIGS. 1 to 3, by way of illustration.

The connection receptacle 15 includes a bore 33 shaped and dimensioned for receiving said plug 17 with electrical contact. As shown, the plug 17 has two portions 34a and 34b of different diameters, and consequently the bore 33 in the receptacle 15 comprises two aligned holes 35a and 35b of corresponding different diameters. The small-diameter end of the plug includes a groove 37. The tip 38 of the plug is chamfered to the edges of the groove. Furthermore, a locking spring 40 is secured to the connection receptacle and includes at least one flexible branch suitable for engaging in the groove 37 when the plug is engaged in the bore 33. The spring is of the spring steel wire type.

More precisely, the bore 33 is a through bore and thus presents an inlet orifice 42 into which the plug is engaged and an outlet orifice 44 of smaller diameter through which the tip 38 of the plug projects, also revealing the groove 37. The length of the plug 17 and the length of the bore are such that the groove 37 lies beyond the outlet orifice 44 of the bore 33 when the plug 17 is engaged therein. As shown, the spring 40 is situated beside the outlet orifice 44 so as to co-operate with the groove 37 of the plug 17. Advantageously, the spring 40 is in the form of a substantially U-shaped hairpin, mounted between two projecting elements 48, 49 of the receptacle. The branches of the hairpin have facing curved portions 50 in the vicinity of the outlet orifice and on either side thereof. These curved portions lie on the path of the plug, and it can be understood that because the plug has a chamfered end it temporarily splays said curved portions 50 apart until they engage in the groove 37. From that moment on, the plug 17 is mechanically held in the receptacle.

This mechanical locking configuration is favorable to obtaining good sealing of the electrical contact zones between the plug 17 and the receptacle 15. The receptacle further includes an annular sealing gasket 53 surrounding the inside of the outlet orifice 44. This gasket thus comes to bear against the cylindrical surface of the smaller-diameter portion of the plug. At its other end, the receptacle includes an inlet gasket 55 fastened externally around the inlet orifice. Advantageously, the plug has a shoulder 56 that comes to bear against said inlet gasket 55. As mentioned above, co-operation between the spring 40 and the groove 37 ensures that the inlet gasket 55 is compressed between the receptacle 15 and the shoulder 56.

As can be seen in the drawings, the bore 33 also contains two annular contact strips 59 that are spaced apart from each other. These contact strips are made of metal having very low resistivity and they are lightly compressed by the larger-diameter portion 34a of the plug, thereby improving the quality of the electrical contact between the plug and the receptacle.

Thus, when the plug 17 is put into place, sealing is provided at both ends, thereby completely protecting the zone of electrical contact between the plug and the receptacle. Said plug is prevented from moving axially without any axial slack by means of the locking spring 40 and by means of the inlet gasket 55 being compressed.

Figure 4:
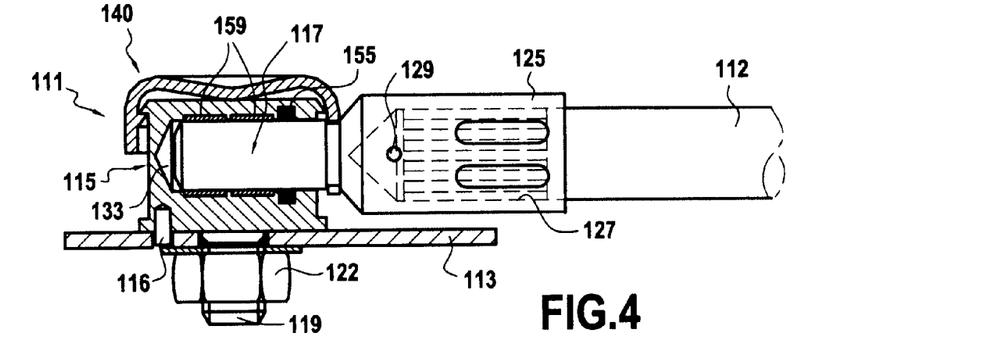
FIG. 4 is a general view similar to FIG. 1 showing a variant device in accordance with the invention.
Figure 5:
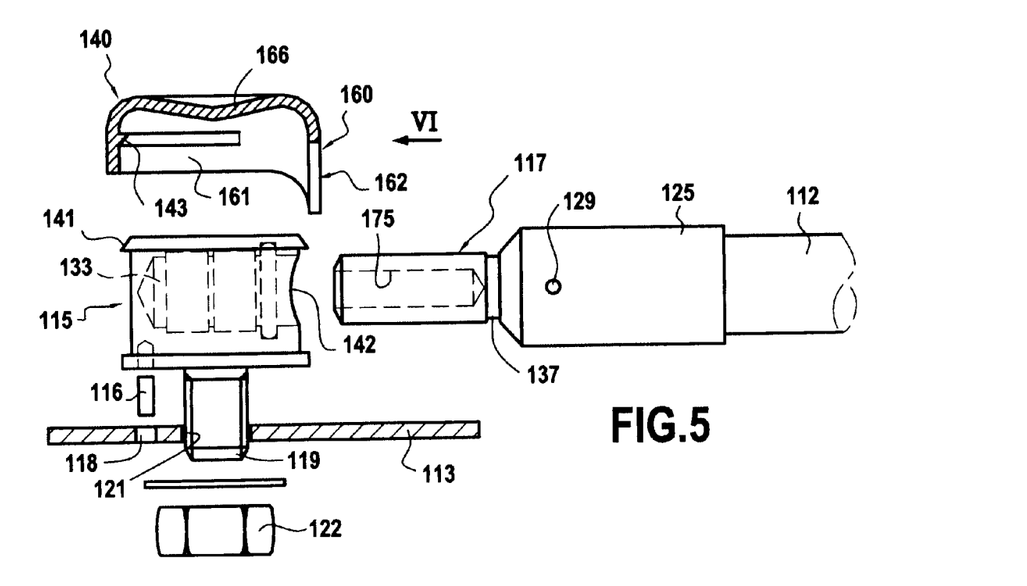
FIG. 5 is a view analogous to FIG. 4, the elements of the connection device being separate from one another.
Figure 6:
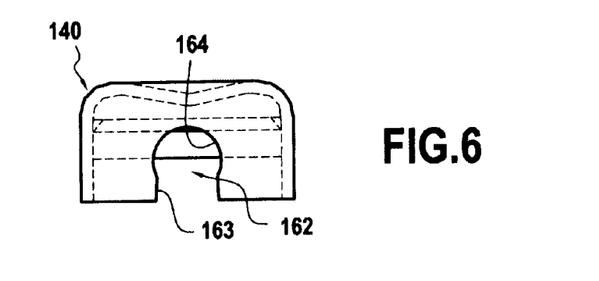
FIG. 6 shows the cover of said variant, seen looking along arrow VI in FIG. 5.

In the embodiment of FIGS. 4 to 6, elements analogous to those of the above-described embodiment are given the same numerical references plus 100. There can thus be seen a connection device 111 between an electric cable 112 and a conductive structure 113 forming a flat conductor, namely a bar forming part of an electrical return circuit in an airplane. As above, the connection device comprises a female type connection receptacle 115 fastened to the structure 113, and a male type plug 117 connected to an end of the cable 112.

The receptacle 115 is made of high conductivity metal. It has a single threaded extension 119 passing through a hole 121 in the conductive structure 113. A nut 122 is engaged on the threaded portion and serves to provide mechanical mounting and electrical connection between the receptacle 115 and the conductive structure 113. In this example, it should be observed that the entire receptacle 115 may be machined from a cylindrical metal blank, thereby reducing its cost. A pin 116 is inserted in a housing of the receptacle and occupies a bore 118 formed in the conductive structure 113, so as to prevent the receptacle from turning.

Furthermore, the plug 117, made entirely out of high conductivity metal, is extended by a bushing 125 having a deformable wall constituting a crimping cylinder, as in the above example. This bushing thus includes a blind hole 127 having a thin wall that enables it to be flattened. A conductive end of the electric cable 112 is engaged in said hole before flattening and permanently deforming the wall. As above, the bushing 125 includes an inspection slot or hole 129.

The connection receptacle 115 includes a bore 133 that is shaped and dimensioned for receiving the plug 117 with electrical contact. Unlike the above embodiment, the portion of the plug 117 that is for engaging in the bore 133 presents a diameter that is constant. However, the bore 133 is a blind hole of corresponding diameter.

As in the above example, the plug has a groove 137, but this groove is formed at a distance from the end of the plug 117. The bore 133 in the receptacle thus presents only an inlet orifice 142 into which the plug is engaged. As can be seen in the drawings, the length of the plug and the length of the bore are such that said groove 137 lies outside the inlet orifice 142 when the plug is engaged in the bore in the receptacle. As above, this bore 133 contains two annular contact strips 159 that are spaced apart from each other. A larger number of them could be provided. These contact strips are made of metal having very low resistivity and they are compressed by the plug when it is engaged in the bore. The bore also houses an annular gasket 155, e.g. an O-ring, placed in a housing inside the bore, in the vicinity of the inlet orifice. This gasket may be overmolded directly in the receptacle. It possesses one or more lips for providing sealing when the plug is engaged.

The device is fitted with a locking spring that comprises a cover 140 shaped to co-operate simultaneously with the groove 137 and with a projecting and annular attachment ring 141 of the receptacle. In this example, the projecting rim is defined at the end of the receptacle 115 that is remote from its end carrying the threaded extension 119.

The cover has flexible fingers 161 and the ends of these fingers are provided with teeth 143 constituting barbs that co-operate with said projecting rim of the receptacle.

Furthermore, the cover 140 includes a lateral extension 160, which is relatively flexible in this example, and in which a lateral opening 162 is defined, which opening is shaped and dimensioned so as to co-operate with the groove 137 in the plug. More precisely, in this example, the opening 162 is a notch having a straight mounting portion 163 that is open to one edge of said lateral extension, and a portion having a rounded outline 164 that is retained with clearance in said groove 137. The straight mounting portion leads into the portion having a rounded outline. The width of the straight portion 163 is slightly smaller than the diameter of the bottom of the groove 137, while the portion having a rounded outline 164 is slightly greater than the diameter of the bottom of the groove. In this way, the cover is engaged by force on the plug and remains attached thereto, with clearance between the lateral extension and the bottom of the groove.

The cover includes a resilient protuberance 166 that bears against the end of the receptacle 115. This resilient protuberance may be made by a central deformation of the cover or by a tab cut out therefrom.

Figure 7:
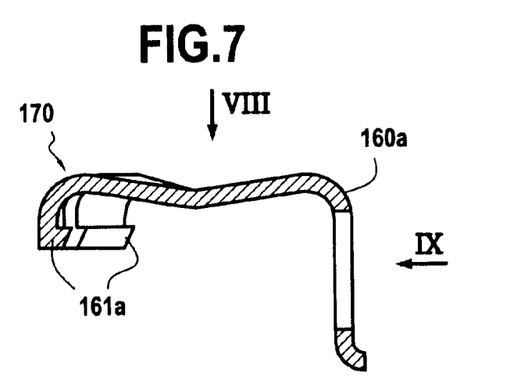
FIG. 7 shows a variant of the cover in section on VII-VII of FIG. 8.
Figure 8:
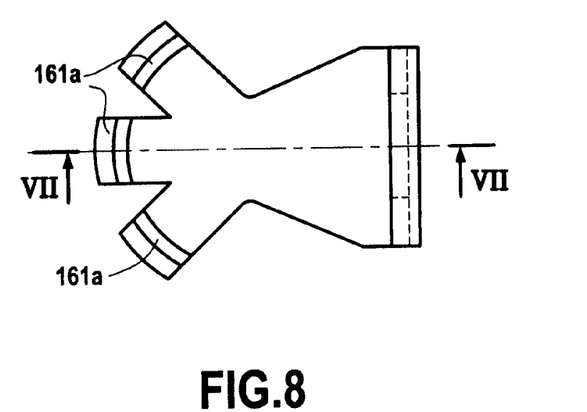
FIG. 8 is a view seen looking along arrow VIII in FIG. 7.
Figure 9:
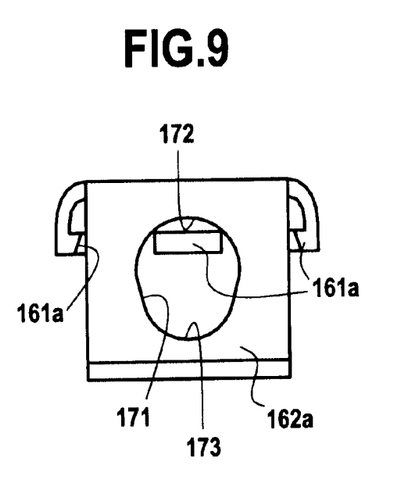
FIG. 9 is a view looking along arrow IX in FIG. 7.

As can be seen in FIGS. 7 to 9, the cover 170 could be of a different shape. By way of example, the number of flexible fingers 161a could be smaller than in the above embodiment such that the cover in this example amounts to a kind of three-pronged fork that is extended by the lateral extension 160a.

In another possibility, the opening made in the lateral extension 162a may be an oblong hole 171 of closed outline comprising a circular portion 172 of diameter substantially equal to the diameter of the plug and a circular portion 173 of diameter smaller than the diameter of the plug but greater than the diameter of the bottom of said groove. Thus, the cover 170 is mounted by sliding the plug through the circular portion of greater diameter in the oblong hole 171 until the lateral extension engages in the groove 137. While being assembled on the receptacle, the lateral extension tilts and locks in the groove by engagement of its smaller-diameter circular portion. Thus, and advantageously, the cover is held captive.

As shown, the plug 117 may be lightened by making a blind hole 175 from its distal end.

It should be observed that the embodiment of FIGS. 4 to 8 presents the advantage of providing sealing that is more reliable, simpler, and less expensive, since it requires only one gasket.

Other modifications are possible, in particular concerning the structure of the locking spring. For example, it may comprise two portions, a cover of the kind described above and resilient means housed in the bottom of the blind hole of the receptacle in order to push back the plug resiliently and reinforce the locking effect. This then makes it possible to use a cover that is significantly more rigid and thus more robust.

FIGS. 10 to 15 show another embodiment similar to that of FIGS. 4 to 9. Elements that are analogous are given the same numerical references plus another 100. There can thus be seen a connection device 211 comprising a connection receptacle 215 made of high conductivity metal that is fastened to a conductive structure 213 by a threaded extension 219 and a nut 222. The device also comprises a plug 217 of high conductivity metal. The receptacle has a bore 233 for receiving the plug 217. In this example the bore 233 is parallel to the conductive structure 213. The plug has a groove 237 formed therein at a distance from its end. Once the plug is fully engaged in the bore 233, the groove 237 lies outside the inlet orifice 242 of the bore 233. There can also be seen the two annular contact strips 259 of very low conductivity metal that are arranged inside the bore 233.

Figure 10:
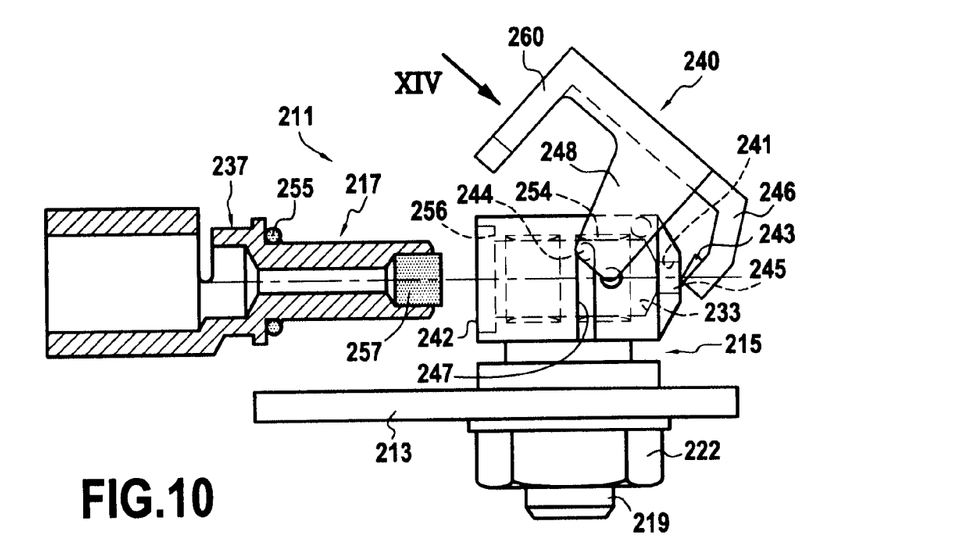
FIG. 10 is an elevation view of another embodiment of the device in accordance with the invention, the plug being shown in section.
Figure 14:
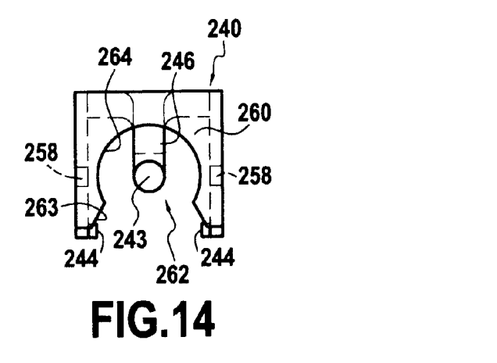
FIG. 14 is a detail view looking along arrow XIV of FIG. 10.

The device also has a locking cover 240 shaped to co-operate simultaneously with the groove 237 and with an attachment rim 241 of the receptacle, constituted in this example by the edge of a hole 245 situated axially in line with the bore 233, at its end remote from the inlet orifice 242. More precisely, the cover 240 is provided with a finger 246 having a hook 243 (in the form of a chamfered cylinder) that co-operates with the edge of the hole 245. As above, the cover includes a lateral extension 260 having an opening 262 defined therein that is shaped and dimensioned to co-operate with the groove 237 of said plug. As can be seen in FIG. 14, the opening 162 is a notch having an outwardly-flared mounting portion 263 that is open to an edge of the lateral extension 260. This mounting portion 264 leads to a portion of rounded outline that becomes engaged in the groove 237.

Figure 15:
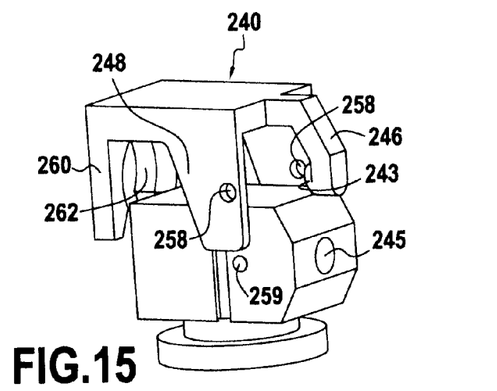
FIG. 15 is a detail view in perspective of the receptacle and the cover.

Furthermore, the cover is provided with two studs 244 situated internally and facing each other on parallel side faces 248. These studs are constrained to move in opposite rectilinear parallel grooves 247 formed in the receptacle 215 so that said cover 240 is held captive to said receptacle.

Furthermore, the plug is provided with an annular gasket 255 situated close to the groove 237, while the receptacle includes an internal shoulder 256 adjacent to the inlet orifice 242.

In the example described, the hole 245 communicates with the bore 233. In order to provide sealing after mounting, the end of the plug carries a cylindrical gasket 257 that becomes compressed at the end of the bore 233.

Naturally, the receptacle need not have threaded segments 219 and may be welded directly to the conductive structure 213.

Figure 11:
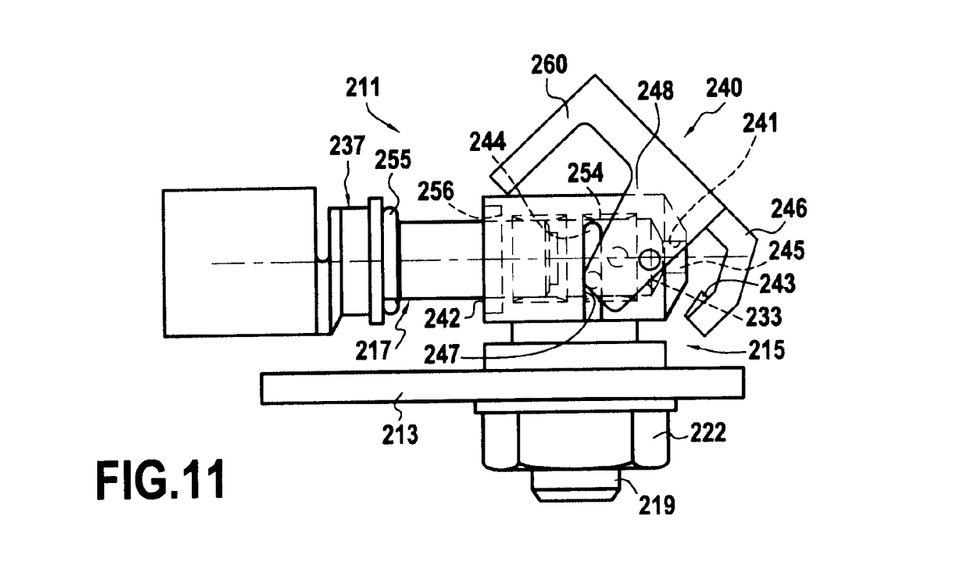
FIGS. 11 to 13 show the plug being assembled and locked to its receptacle.
Figure 12:
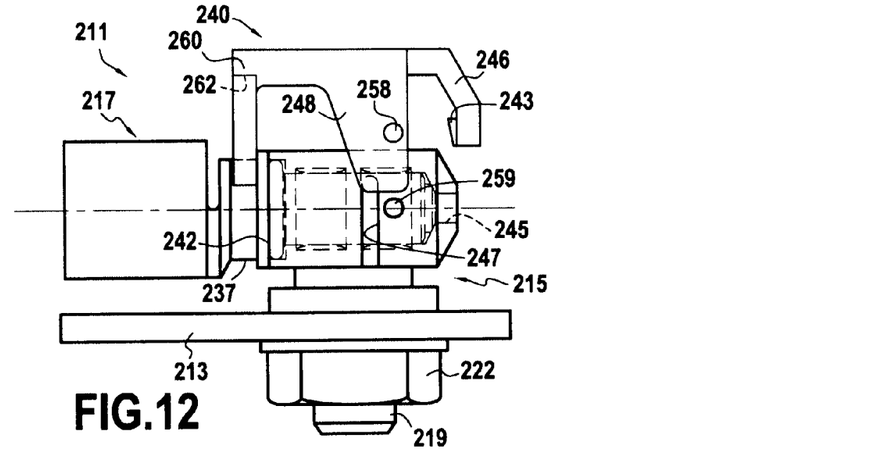
Figure 13:
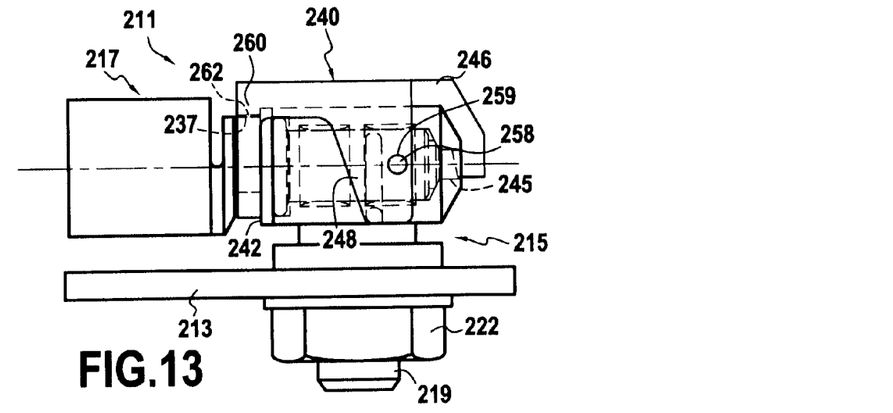

Operation is shown in FIGS. 11 to 13. With the cover tilted as shown in FIG. 11, the inlet orifice 242 of the bore in the receptacle is disengaged and it is possible to engage the plug 217 in the receptacle. Thereafter, as shown in FIG. 12, the cover 240 is tilted while being held as much as possible over the receptacle so that the opening 262 is positioned over the groove 237 of the plug. This is possible only when the plug 217 is pushed fully into the bore 233 of the receptacle and the annular gasket 255 is no longer visible, since it is in contact with the shoulder 256. In this position, the gasket 257 is also compressed against the end of the bore in the receptacle. While holding the plug in this position, it then suffices to lower the cover 240 onto its receptacle, as shown in FIG. 13, until the lateral extension 260 locks, after deforming elastically, on the diameter of the groove 237, and the hook 243 co-operates with the edge 241 of the hole 245. A positioning inspection window constituted by a hole 258 in the cover comes into register with a colored zone 259 of the receptacle giving the user a visual indication that locking has taken place. The device has a hole 258 in each of its lateral faces 248, and the base has two corresponding colored zones 259.

FIGS. 16 to 20 show yet another embodiment in which analogous structural elements are given the same numerical references increased by 100 once more. These elements are not described again in detail. In this embodiment, the bore 333 in the receptacle for receiving the plug 317 is perpendicular to its mounting plane, i.e. to the conductive structure 313. In other words, after mounting, the axis of the plug 317 coincides with the axis of the threaded segment 319 for fastening the receptacle 315.

Figure 16:
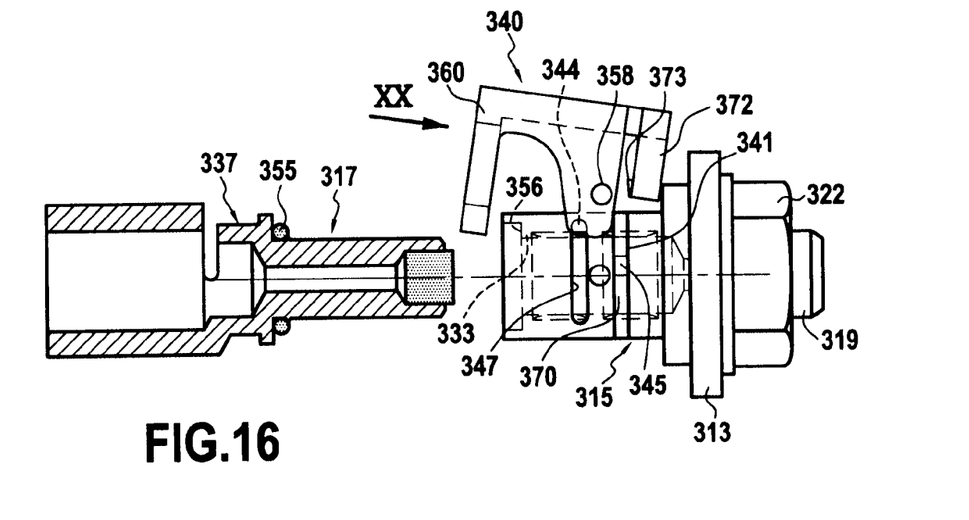
FIG. 16 shows another embodiment of a device in accordance with the invention shown in a manner analogous to FIG. 10.
Figure 20:
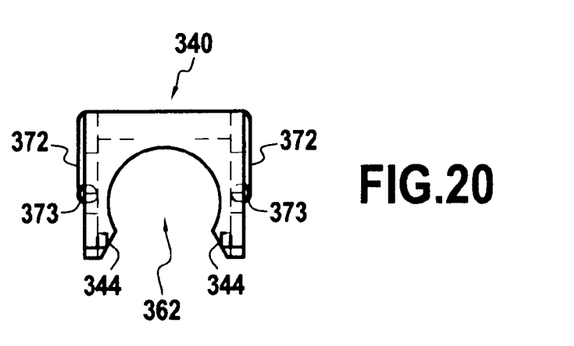
FIG. 20 is a detail view seen looking along arrow XX of FIG. 16.

In this embodiment, the receptacle 315 has two above-mentioned attachment rims 341 situated laterally. These are holes 345 formed in parallel and opposite lateral ribs 370 of the receptacle. The cover also has two parallel fingers 372 having hooks 373 that co-operate respectively with said attachment rims 341, i.e. the holes 345, the cover 340 otherwise being substantially identical to that of the above-described embodiment. In particular, it naturally includes two studs 344 that are arranged in two parallel rectilinear grooves 347 of the receptacle for holding it captive.

Figure 17:
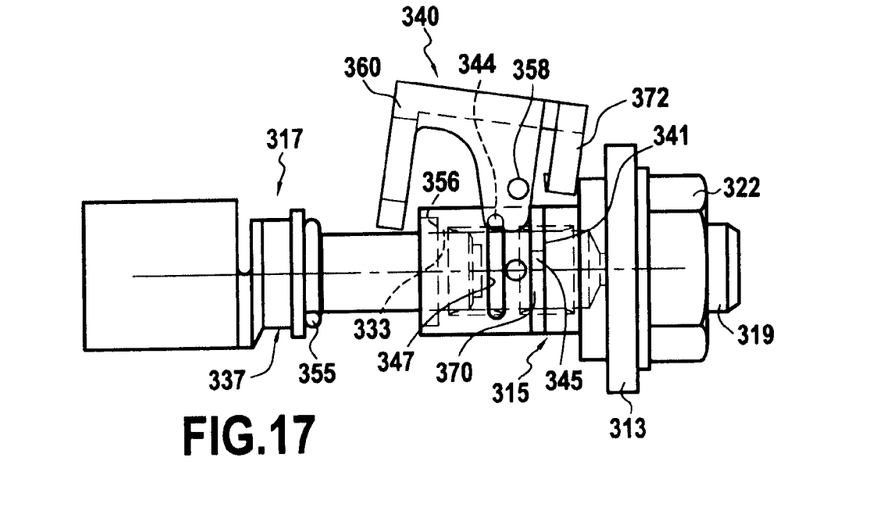
FIGS. 17 to 19 show the device being mounted and locked.
Figure 18:
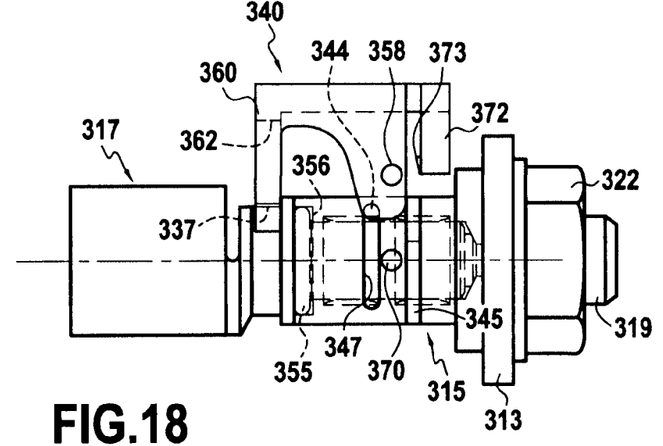
Figure 19:
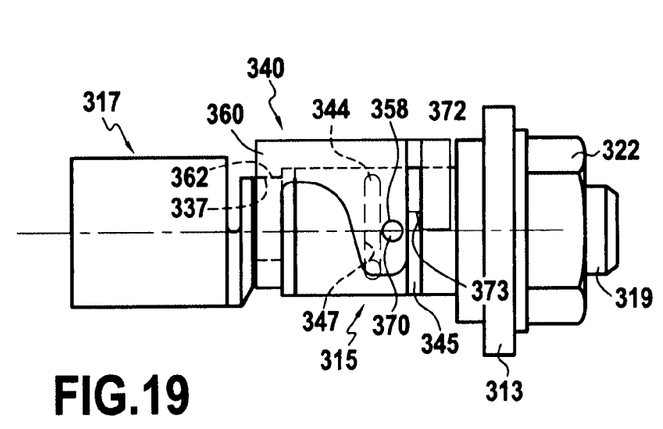

More precisely, the cover has at least one positioning inspection window (a hole 358), and the receptacle includes a colored zone 359 with which said window comes into register when the cover is correctly positioned (see FIG. 19). The mounting shown in FIGS. 17 to 19 is comparable with that of the above-described embodiment. With the cover 317 raised, the plug 317 is engaged in the bore 333 of the receptacle until the annular gasket 355 comes to bear against the shoulder 356. Thereafter, the cover 340 is tilted until the lateral extension 360 engages in the groove 337 of the plug (FIG. 18). The cover is then lowered until the extension 360 locks by elastic deformation on the diameter of the groove 337, and until the hooks 373 engage in the holes 345.

The invention claimed is:

1. An electrical connection device between an electric cable and a conductive structure, comprising:
   a female type connection receptacle fastened to said conductive structure, and a male type plug connected to one end of said cable, wherein said receptacle includes a bore shaped and dimensioned to receive said plug with electrical contact, wherein said plug includes a groove, wherein a locking spring is mounted on said connection receptacle and includes a flexible branch suitable for engaging in said groove when said plug is engaged in said bore, and wherein said groove is formed at a distance from the end of said plug, said bore in said receptacle presents an inlet orifice via which the plug is engaged, the length of the plug and the length of said bore are such that said groove is situated outside the inlet orifice when the plug is engaged in said bore, and said locking spring comprises a cover shaped to co-operate both with said groove and with an attachment rim of said receptacle.

2. An electrical connection device according to claim 1, wherein said cover has a lateral extension with an opening defined therein, the opening being shaped and dimensioned to co-operate with the groove of said plug.

3. An electrical connection device according to claim 2, wherein said opening is a notch having a mounting portion that opens into an edge of said lateral extension and that leads to a portion of rounded outline that is retained in said groove.

4. An electrical connection device according to claim 2, wherein said opening is an oblong hole with a closed outline having a circular portion of diameter substantially equal to the diameter of said plug and a circular portion of diameter smaller than the diameter of said plug but greater than the diameter of the bottom of said groove.

5. An electrical connection device according to claim 1, wherein said bore in said receptacle is a blind hole.

6. An electrical connection device according to claim 1, wherein said cover has flexible fingers, and the ends of said fingers are provided with teeth forming barbs that co-operate with said attachment rim.

7. An electrical connection device according to claim 1, wherein said cover includes a resilient projection bearing against the end of said receptacle.

8. An electrical connection device according to claim 1, wherein said cover is provided with two studs constrained to move in opposite parallel grooves of said receptacle so that the cover is held captive to said receptacle.

9. An electrical connection device according to claim 8, wherein said attachment rim of said receptacle is constituted by a hole, and said cover is provided with a finger having a hook co-operating with the edge of said hole.

10. An electrical connection device according to claim 9, wherein said hole opens out in axial alignment with said bore, and the end of said plug carries a sealing gasket.

11. An electrical connection device according to claim 8, wherein said plug is provided with an annular gasket coming into contact with an internal shoulder of said receptacle.

12. An electrical connection device according to claim 8, wherein the bore of said receptacle for receiving the plug is perpendicular to a mounting plane thereof, said receptacle includes two above-mentioned attachment rims in the form of holes disposed laterally, and said cover includes two parallel fingers having hooks that co-operate with respective ones of said attachment rims.

13. An electrical connection device according to any one of claims 8 to 12, wherein said cover includes a positioning inspection window, and the receptacle includes a colored zone with which said window is positioned in register when the cover is correctly positioned.

* * * * *